Oct. 11, 1938.  J. J. GEDEON  2,132,409
VEHICLE TRAILER
Filed June 24, 1937  4 Sheets-Sheet 1
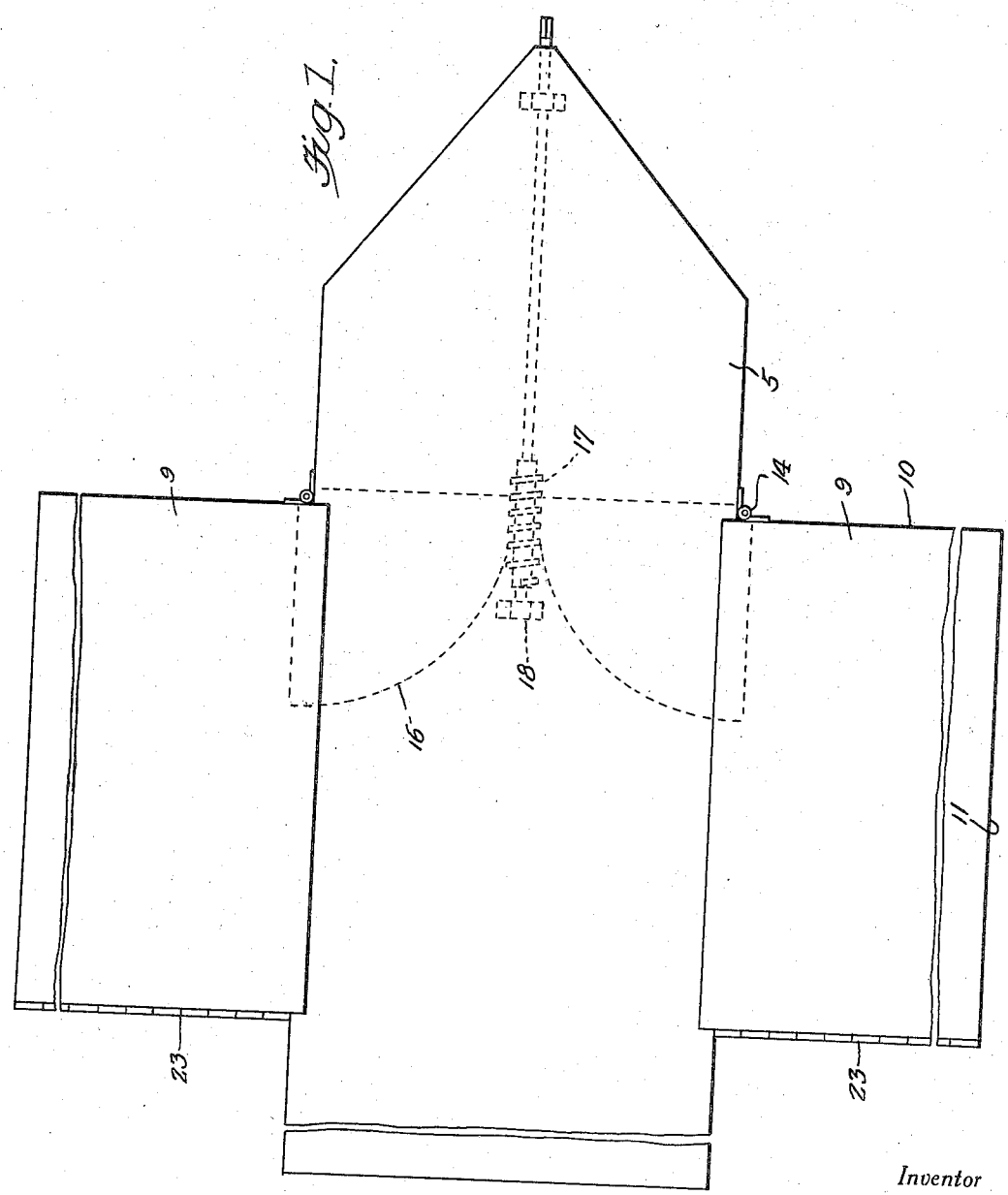
Inventor
Joseph J. Gedeon,
By Clarence A. O'Brien
Hyman Berman
Attorneys

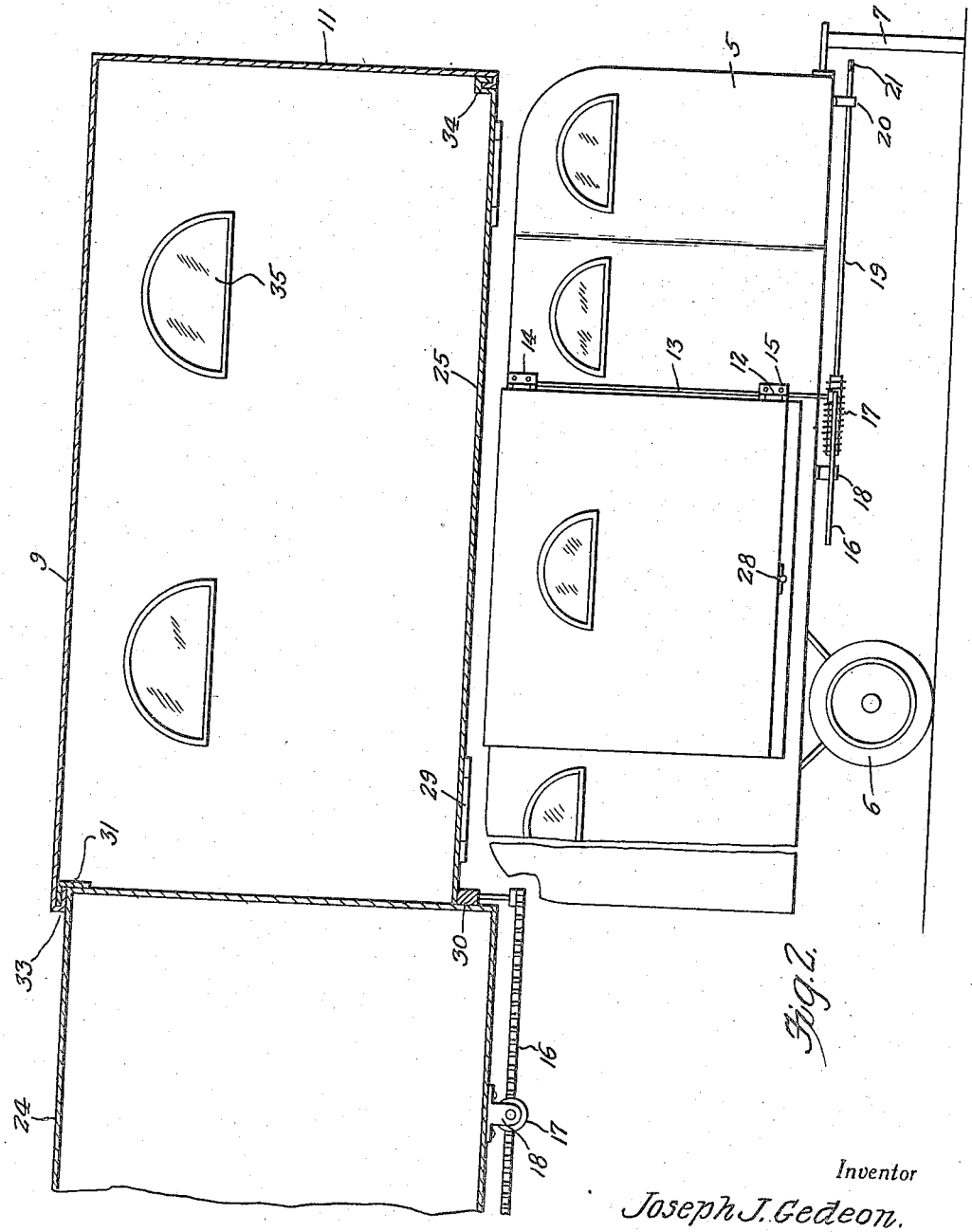

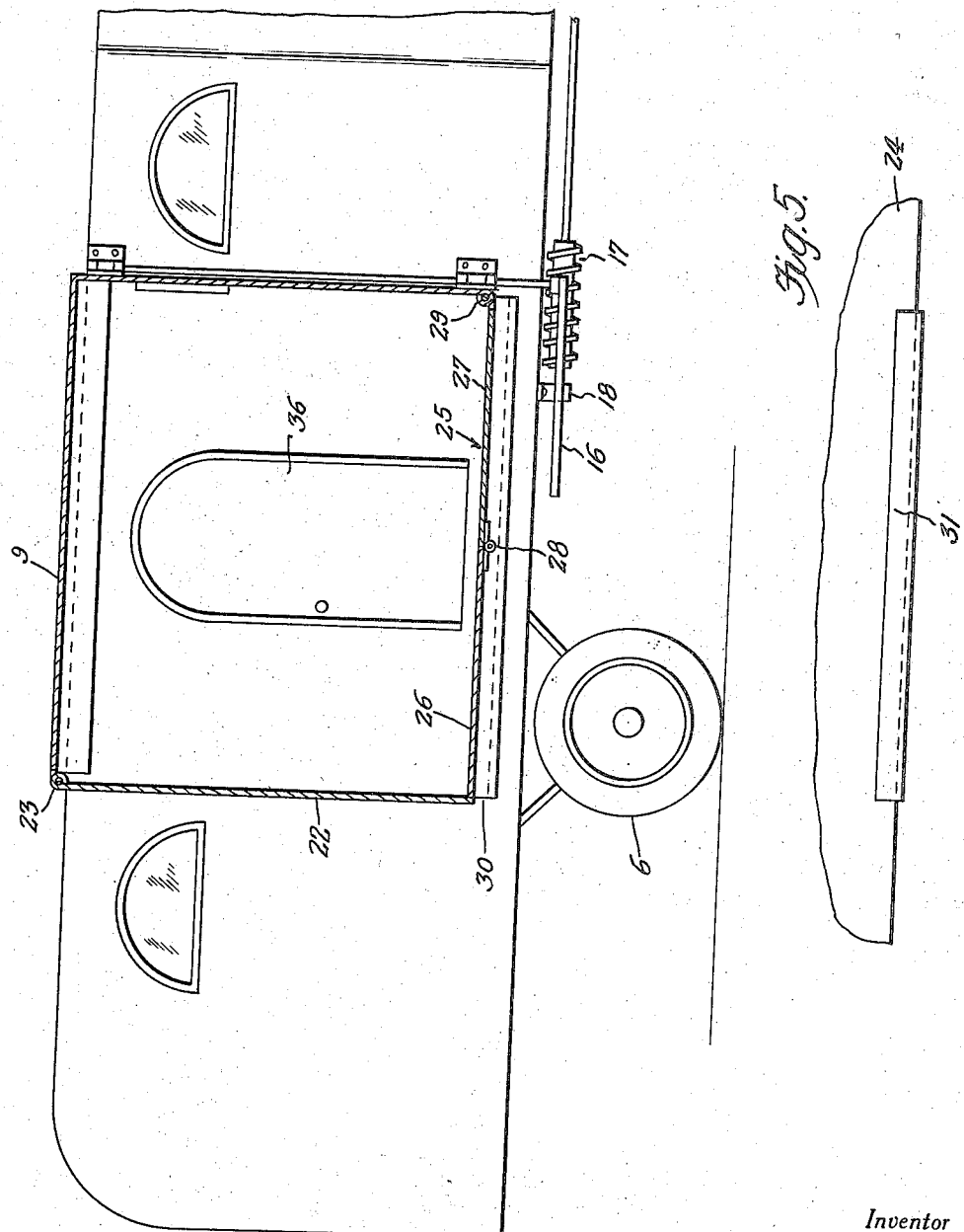

Oct. 11, 1938.  J. J. GEDEON  2,132,409
VEHICLE TRAILER
Filed June 24, 1937  4 Sheets-Sheet 4
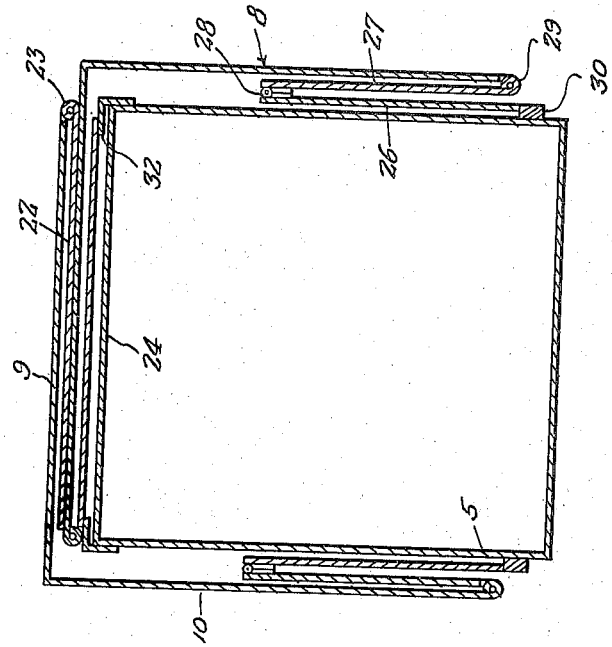
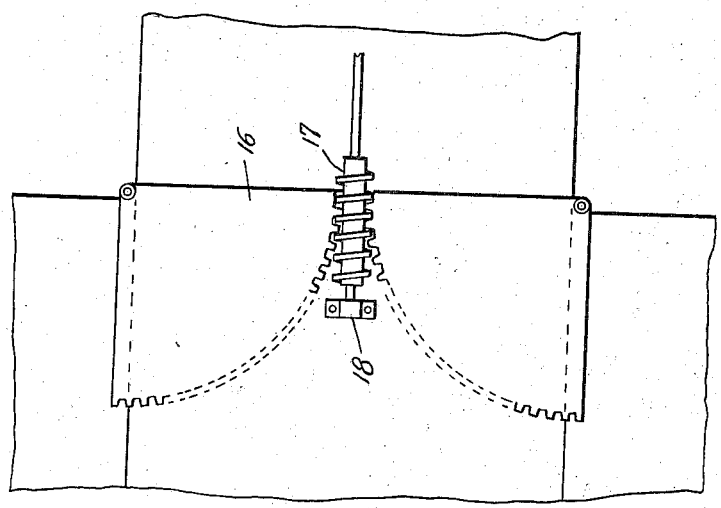
Inventor
Joseph J. Gedeon.
By Clarence A. O'Brien
Hyman Berman
Attorneys Patented Oct. 11, 1938

2,132,409

UNITED STATES PATENT OFFICE 2,132,409

VEHICLE TRAILER

Joseph J. Gedeon, Fort Lauderdale, Fla.

Application June 24, 1937, Serial No. 150,186

4 Claims. (Cl. 296—23)

The present invention relates to vehicle trailers and has for its principal object to provide a trailer body construction embodying a main compartment or room and a plurality of foldable compartments or rooms swingably mounted at opposite sides of the main compartment or room and adapted for movement into and out of position at the sides of the trailer to provide additional, individual rooms therefor.

A further object is to provide auxiliary foldable rooms of this character swingably mounted at each side of the trailer body and embodying rigid walls, roof and floor constructions.

A further object is to provide means for simultaneously moving the auxiliary rooms into and out of folded position at opposite sides of the trailer body.

An additional object is to provide an apparatus of this character of simple and practical construction, neat and attractive in appearance, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view showing the auxiliary rooms in outwardly extended position.

Figure 2 is a side elevational view.

Figure 3 is a fragmentary vertical sectional view through one of the auxiliary rooms shown in extended position.

Figure 4 is a fragmentary side elevational view of the trailer showing one of the auxiliary rooms in section.

Figure 5 is a fragmentary top plan view of the main trailer body showing the interlocking strip for the roof of the auxiliary room.

Figure 6 is a bottom plan view of the operating means for swinging the auxiliary rooms into and out of collapsed position and Figure 7 is a vertical transverse sectional view through the trailer showing the auxiliary rooms in collapsed position.

Referring now to the drawings in detail, wherein for the purpose of illustration I have disclosed a preferred embodiment of invention, the numeral 5 designates a main trailer body mounted on wheels 6, one end of the body being supported by a prop 7 when detached from a towing vehicle.

At each side of the trailer body 5 is arranged an auxiliary collapsible room or compartment designated generally by the numeral 8, each of said auxiliary rooms embodying a top 9 and integrally connected front and side walls 10 and 11 respectively. The inner edge of the front wall 10 is swingably connected to the body 5 of the trailer by hinges 12, the pintle of said hinges comprising an elongated rod 13 extending from the upper hinge 14 to the lower hinge 15 and depending below the bottom of the trailer 5 and having a gear segment 16 fixedly secured to the lower end thereof.

It is to be understood that each of the auxiliary rooms is similarly mounted upon the hinges 12 and each of the rods 13 is provided with a gear segment at its lower end as will be apparent from an inspection of Figs. 1 and 6 of the drawings.

These two edges of the gear segment 16 are supported in a horizontal position under the trailer body and in spaced relation from each other for operative engagement by a worm 17 having one end journalled in a bracket 18 secured to the under side of the trailer, the opposite end of the worm having an operating rod 19 extending forwardly therefrom and supported in a bearing bracket 20, the forward extremity of the rod being square shaped, as shown at 21 to receive a crank to manipulate the worm and the gear segment 16 as will be apparent.

It is to be understood that the rod 13 connecting the hinges 14 and 15 is fixedly secured to the portion of the hinge which is attached to the front wall 10 of the auxiliary compartment whereby upon the manipulation of the worm and gear segment 16 the said compartment will be swung laterally into and out of position with respect to the sides of the trailer body 5.

The rear wall 22 of the auxiliary compartment 10 is hingedly attached as at 23 to the rear edge of the top 9, as more clearly shown in Figs. 1, 4 and 7, in order that said rear wall 22 may be swung upwardly under the top 9 and above the roof 24 of the main trailer body for collapsing said wall, in a manner as will be apparent from an inspection of Fig. 7 of the drawings.

The front wall 10 must be slightly wider than the distance between the hinge 14 and the rear end of the trailer body so that the side wall 11 will pass in rear of the rear end of the trailer body when the wall 10 is swung inwardly toward the trailer body and after the rear wall 22 is swung upwardly on its hinge 23. Thus when the parts are in the position shown in Figure 7 the two side walls 11 of the two auxiliary compartments are extending across the rear wall of the trailer body. If desired the rear end of the trailer body can be rounded and the side wall 11 of either one or both of the auxiliary compartments can be similarly rounded and if this is done the front wall 10 of each auxiliary compartment need not be made but slightly wider than the distance between the ends 14 and the rear end of the trailer body.

The bottom 25 of the auxiliary compartment is formed of a pair of hinged sections 26 and 27, hingedly connected to each other as at 28 and also hingedly connected as at 29 to the lower edge of the front wall 10. The bottom 25 is thus adapted to fold upwardly for positioning against the side walls of the trailer body 5 when the auxiliary rooms are in folded or collapsed position.

Supporting rails 30 are attached to the sides of the main trailer body for supporting an edge of the bottom of the auxiliary room when in either a collapsed or extended position.

Angle irons 31 are secured to the side edges of the roof 24 of the main trailer body 5, one section of said angle irons being faced above the roof 24 and opening inwardly to provide an interlocking connection with an inwardly extending flange 33 formed on the inner edge of the top 9 of the auxiliary room, as will be apparent from an inspection of Fig. 3 of the drawings. This construction limits the outward swinging movement of the auxiliary room and also provides a weather tight seal between the main room 24 and the auxiliary room 9. A similar interlocking connection 34 is provided between the outer edge of the bottom section 25 and the lower edge of the side wall 11 of the auxiliary compartment.

Windows 35 of suitable construction, are provided in the auxiliary rooms or compartments, as well as in the main trailer body 5 and doors 36 are also provided in the side walls of the main trailer body leading into the auxiliary rooms.

It is believed the details of construction and manner of operation of the apparatus will be readily understood from the foregoing without further detail explanation.

What is claimed is:—

1. A vehicle of the class described comprising a main body, an auxiliary room forming body including a top, a front wall and a side wall fastened together, hinge means connecting the inner edge of the front wall to a side portion of the main body, the top of the auxiliary body passing over the top of the main body when the parts are swung into inoperative position on the hinge means, and a rear wall hinged to one edge to an adjacent edge of a wall of the auxiliary body, the side wall of the auxiliary body to pass in rear of the main body when the parts are folded into inoperative position.

2. A vehicle of the class described comprising a main body, an auxiliary room forming body including a top, a front wall and a side wall connected together, hinge means for connecting the inner edge of the front wall with the side portion of the main body, the top of the auxiliary body moving over the top of the main body when the parts are swung into inoperative position on the hinge means, a rear wall hingedly connected at its upper edge to the rear edge of the top of the auxiliary body, floor forming sections hingedly connected together, with one edge hingedly connected to the lower edge of the front wall and means for supporting the floor sections from a side of the main body.

3. A vehicle of the class described comprising a main body, an auxiliary room forming body including a top, a front wall and a side wall connected together, hinge means for connecting the inner edge of the front wall with the side portion of the main body, the top of the auxiliary body moving over the top of the main body when the parts are swung into inoperative position on the hinge means, a rear wall hingedly connected at its upper edge to the rear edge of the top of the auxiliary body, floor forming sections hingedly connected together, with one edge hingedly connected to the lower edge of the front wall and means for supporting the floor section from a side of the main body, and supporting means at the top of the main body for supporting the rear wall of the auxiliary body when the parts of the auxiliary body are in inoperative position.

4. A vehicle of the class described comprising a main body, an auxiliary room forming body including a top, a front wall and a side wall connected together, hinge means for connecting the inner edge of the front wall with the side portion of the main body, the top of the auxiliary body moving over the top of the main body when the parts are swung into inoperative position on the hinge means, a rear wall hingedly connected at its upper edge to the rear edge of the top of the auxiliary body, floor forming sections hingedly connected together, with one edge hingedly connected to the lower edge of the front wall and means for supporting the floor section from a side of the main body, and supporting means at the top of the main body for supporting the rear wall of the auxiliary body when the parts of the auxiliary body are in inoperative position, said means including a flange and a flanged part on the top of the auxiliary body interlocking with the flange when the auxiliary body is in operated position.

JOSEPH J. GEDEON.